United States Patent
Garcia Meliço

(10) Patent No.: US 9,651,310 B2
(45) Date of Patent: May 16, 2017

(54) HEAT RECOVERY SYSTEM, ITS HEAT RECOVERY PROCESS AND USE

(75) Inventor: José Alberto Garcia Meliço, Seixal (PT)

(73) Assignee: EIDT—ENGENHARIA, INOVACAO E DESENVOLVIMENTO TECNOLOGICO, SA., Alcobaca (PT)

( * ) Notice: Subject to any disclaimer, the term of this patent is extended or adjusted under 35 U.S.C. 154(b) by 999 days.

(21) Appl. No.: 13/877,858

(22) PCT Filed: Oct. 12, 2011

(86) PCT No.: PCT/IB2011/054506
§ 371 (c)(1),
(2), (4) Date: Jun. 11, 2013

(87) PCT Pub. No.: WO2012/049637
PCT Pub. Date: Apr. 19, 2012

(65) Prior Publication Data
US 2013/0269917 A1    Oct. 17, 2013

(30) Foreign Application Priority Data
Oct. 13, 2010    (PT) .......................................... 105334

(51) Int. Cl.
*F28D 7/02*    (2006.01)
*F24D 17/00*    (2006.01)
(Continued)

(52) U.S. Cl.
CPC ................ *F28D 7/024* (2013.01); *E03C 1/00* (2013.01); *F24D 17/0005* (2013.01);
(Continued)

(58) Field of Classification Search
CPC .... F28D 7/024; F24D 17/0005; F24D 17/001; E03C 2001/005
(Continued)

(56) References Cited

U.S. PATENT DOCUMENTS 2,348,093 A    5/1944    Pasman
2,650,800 A    9/1953    Taylor
(Continued)

FOREIGN PATENT DOCUMENTS

DE    G 86 00 554.5 U1    5/1987
EP    1 571 404 A1    9/2005
(Continued)

OTHER PUBLICATIONS

International Search Report, mailed Dec. 19, 2012 in connection with PCT International Application No. PCT/IB2011/054506, filed Oct. 12, 2011.
(Continued)

*Primary Examiner* — Janie Loeppke
(74) *Attorney, Agent, or Firm* — John P. White; Cooper & Dunham LLP

(57) ABSTRACT

The present invention relates to a heat recovery system, of a part of the energy spent in the preparation of waste water, e.g. water from baths or kitchens, energy that is usually lost when the water is drained into the sewer. This energy can be recovered and reused to heat water that is readily used, for example in the shower, or can be stored in a water heater. This system is designed in such a way that, together with any tub or shower base, constitutes a heat recovery shower base or a heat recovery bath, for example. The energy recovery system is composed, preferably, by a coil generally made of copper inside a PVC pipe that has at one end a throttle plate also made of PVC, a filter for the protection of the system against impurities, turbulence fins, and an external casing. The system has a compact structure which benefits its rapid adaptation.

18 Claims, 9 Drawing Sheets

(51) Int. Cl.
   *F28D 21/00* (2006.01)
   *E03C 1/00* (2006.01)
(52) U.S. Cl.
   CPC .... *F28D 21/0012* (2013.01); *E03C 2001/005* (2013.01); *F24D 2200/20* (2013.01); *Y02B 30/566* (2013.01)
(58) Field of Classification Search
   USPC ..................................................... 4/601, 615
   See application file for complete search history.

(56) References Cited

U.S. PATENT DOCUMENTS

| | | | |
|---|---|---|---|
| 4,398,308 A * | 8/1983 | Berg | A47K 3/28 165/66 |
| 4,550,771 A * | 11/1985 | Arbabian | F24D 11/005 126/643 |
| 4,690,208 A * | 9/1987 | Deck | F24D 17/001 165/119 |
| 5,330,624 A | 7/1994 | Ebert | |
| 2002/0162650 A1 | 11/2002 | MacKelvie | |
| 2011/0289674 A1* | 12/2011 | Rusch | A47K 3/40 4/613 |

FOREIGN PATENT DOCUMENTS

| | | |
|---|---|---|
| FR | 2 868 795 A1 | 10/2005 |
| GB | 2 342 146 A | 4/2000 |
| GB | 2 421 055 A | 6/2006 |
| WO | WO 2005/073474 A1 | 8/2005 |

OTHER PUBLICATIONS

Written Opinion of the International Searching Authority, mailed Dec. 19, 2012 in connection with PCT International Application No. PCT/IB2011/054506, filed Oct. 12, 2011.

* cited by examiner

HEAT RECOVERY SYSTEM, ITS HEAT RECOVERY PROCESS AND USE

CROSS-REFERENCE TO RELATED APPLICATIONS

This application is a §371 national stage of PCT International Application No. PCT/IB2011/054506, filed Oct. 12, 2011, claiming priority of Portuguese Patent Application No. 105334, filed Oct. 13, 2010, the contents of each of which are hereby incorporated by reference in its entirety.

TECHNICAL FIELD OF THE INVENTION

The present invention relates to a heat recovery system functioning as heat exchanger that makes the recovery of a part of the energy spent in the preparation of waste water, including water from baths or kitchens, energy that is usually lost when the water is drained into the sewer. This energy can be recovered and reused to heat the bath water, which is readily used, for example in the shower, or can be stored in a storage tank.

This system is designed so that, together with any tub or shower base, constitutes a heat recovery shower base or a heat recovery bath tub. The energy recovery system is basically constituted by a heat exchanger block that has a tube preferably made of PVC and in its interior there is a coil, preferably made of copper, and has technical improvements that allow an increased efficiency in relation to the known systems, as it will be explained further ahead.

It is a first improvement the existence of a throttle plate that holds the water in the drain hose, slowing the draining.

It is a second improvement the filter to protect the system against impurities, which prevents the clogging of the system.

It is a third improvement the modular construction and the thermal insulation. The system has a compact structure that benefits its rapid adaptation to any type of shower base or bath tub on the market.

The dimensions and the materials of the various components of the system can be adapted by a technician skilled in the art in accordance with the requirements of the project without leaving the scope of the invention.

BACKGROUND OF THE INVENTION

Are known from the prior art systems that use heat from waste water including waste water from showers.

Thus, the document U.S. Pat. No. 4,599,870 by T. Hebert describes a system in terms of heat usage, which has a traditional block and a hot/cold mixing valve. In its whole, it is a fairly conventional and bulky system.

The document DE29806939U1 describes a system use of waste water applied to shower facilities (including communal showers) that also uses a block with a specific type of building but once again not very compact, tailored to the specific application, and a water heater for the hot water.

The document CA2038928A1 describes a heat pump for the production of hot water by a vapour compression system. It has an evaporator that can capture the heat from the external environment while being subjected to the same external environment. A coil system captures radiant heat from the compressor. The operating principle is, therefore, profoundly different from the present invention.

The Portuguese patent application PT104608 entitled "Heat recovery system and corresponding trap" is the document of the closest prior art. This patent application is an alternative to this application in that the system presents a different construction, thermodynamically more evolved with energy efficiency improvements.

There are also operating advantages in particular by the application of new parts with very specific functions and which make the system much more adapted to the real conditions of use. Better thermal insulation and an easier assembly on site. Thus, the thermal balance is reached more quickly, achieving energy savings of around 70%.

The system can also work in reverse, i.e. to cool tap water that must be cooled before being used during a shower. In very hot countries tap water is too hot. In these countries there is a need to cool the water rather than to heat it.

SUMMARY OF THE INVENTION

It is an objective of the present invention to describe a heat recovery system with heat exchanger for the heat recovery that includes an inlet collector of a water network installation of a shower, the water entering the system at a temperature $t1$, an outlet for the water leaving at the temperature $t2$, after passing through a coil that is inside a plastic tube, inside which is the residual water that flows from a drain of a bathing facility, water that runs off and enters the pipe at a temperature $t3$, and that after exchanging heat with the water that enters the collector coil goes out into the sewer at a temperature $t4$, the system comprising a traditional drain with a support valve with cap, waste bucket, thread ring, top seal, bottom seal to ensure the sealing with the floor of the baths, where the heat exchanger system consists of a block (compact casing) within which there is the heat exchanger system, housing that is concealed under the floor of the installation of the baths, the system having an additional filter at the entrance of the tubular deposit that protects the system from any possible clogging, and with means to ensure a turbulent flow inside the deposit, but avoiding a drainage too fast by fitting a circular throttle plate at the end of the pipe and the throttle plate having two cutouts, a lower and smaller cutout (which allows the passage of the debris) and a larger top cutout.

In a preferred embodiment, the heat recovery system presents a separation from the turns of ⅓ the diameter of the coil tube.

In another preferred embodiment, the heat recovery system has fins in a half moon shape, with peripheral half rods that are interspersed alternately and under pressure between each pair of turns where the fins have a lower leg to support the coil in the piping of the waste water.

In yet another preferred embodiment, the heat recovery system has a filtering system that consists of a circular plastic part (filter) that has narrow passages shaped as slots that form one or more complementary sets, and which fit in the plastic holder of the valve.

In another preferred embodiment, the heat recovery system is filled with insulating material inside the outer casing (box).

Still in another preferred embodiment, the heat recovery system has an outer housing made of plastic or of a sheet of metal, and its various parts are welded, bolted, riveted or glued, or simply engaged.

In another preferred embodiment, the heat recovery system has an outer rigid housing of polystyrene that has a pressure fit system or fasteners and eliminates the use of the external metal casing and also does not require the polyurethane insulation.

Still in another preferred embodiment, the heat recovery system has a throttle plate placed at the end of the tubing.

In another preferred embodiment, the heat recovery system has fins with a triangular shape and two half-rods in low relief.

In yet another preferred embodiment, the heat recovery system has fins with a small ledge.

In another preferred embodiment, the heat recovery system has a PVC pipe with O-rings and a coil, 0.012 meters in diameter and 6 meters long.

Still in another preferred embodiment, the heat recovery system has a cold water pipe from the water supply system that is connected to the inlet collector of the coil and from the outlet collector in order to make the connection to the mixer tap.

In another preferred embodiment, the heat recovery system features the use of an intermediate storage system through a water heater.

It is also an aim of the present invention to describe a heat recovery process in which the water enters the collector, leaves the system at a higher temperature $t_2$ when compared to the inlet temperature $t_1$ (water heater), in which case the temperature $t_4$ of the outlet waste water is lower than the inlet temperature $t_3$.

In a preferred embodiment, the heat recovery process presents the tap water leaving the outlet collector preheated and the temperature of the preheating can go up to 28° C. through the heat removed from the waste water, considering 31° C. as the temperature at which the waste water enters the system.

Still in another preferred embodiment, the heat recovery process presents the water that enters the collector (tap water), leaves the system at a temperature $t_2$ lower than the inlet temperature $t_1$ (water cooling system) in which case the outlet temperature $t_4$ of the waste water is higher than the inlet temperature $t_3$.

It is also an objective of the present invention to describe the use of the heat recovery system and of the heat recovery process as a shower or bath base or as a heat recovery from waste water originating from showers or from kitchens.

GENERAL DESCRIPTION OF THE INVENTION

Figure 1:
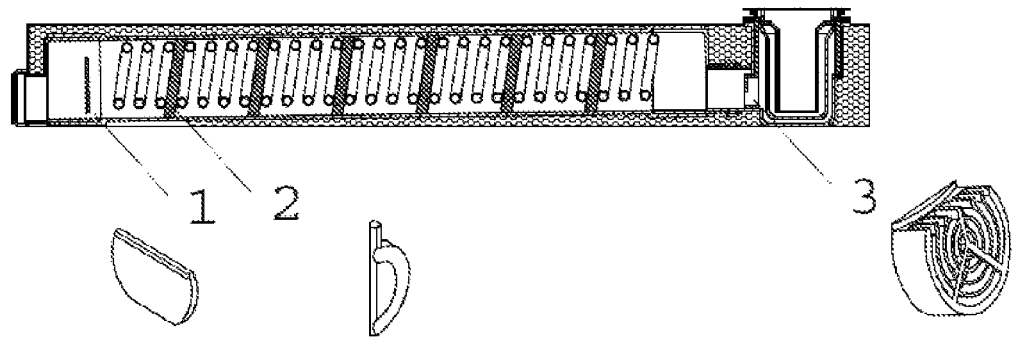
FIG. 1 represents an overview of the heat exchanger system.
Figure 2:
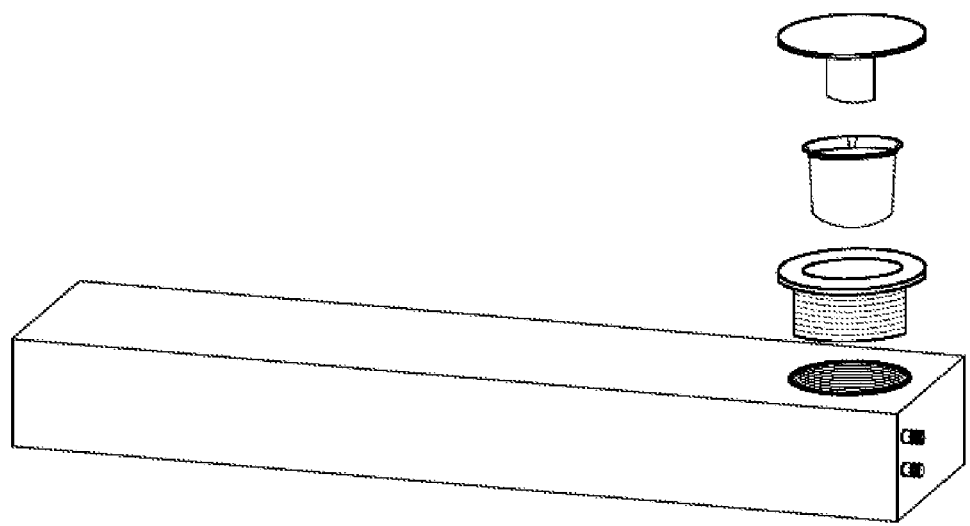
FIG. 2 shows an exploded view of the waste water entrance area (drain) and valve components with a view of the threaded support for the valve of the shower base, cover and bucket to collect debris.
Figure 3:
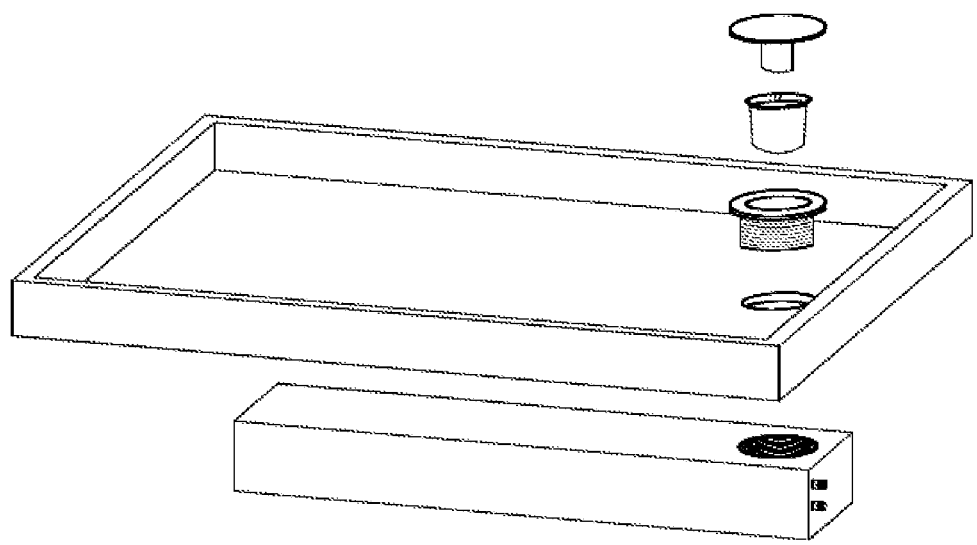
FIG. 3 represents an assembly of the heat exchanger block in the shower base.
Figure 4:
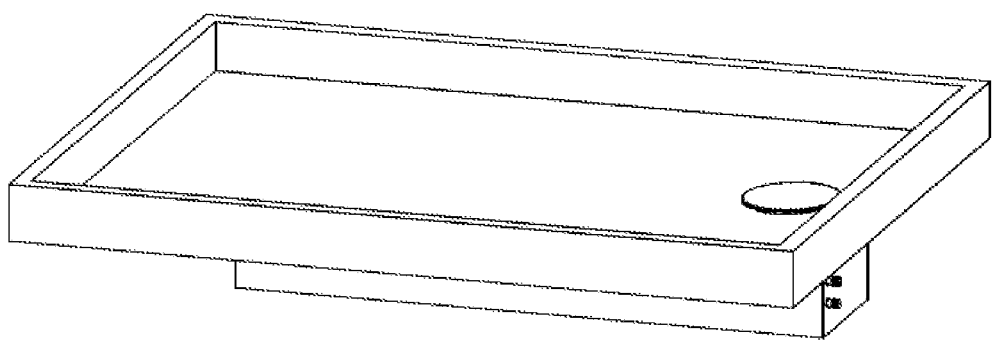
FIG. 4 represents an assembly of the block in a shower base of a bath facility.
Figure 5:
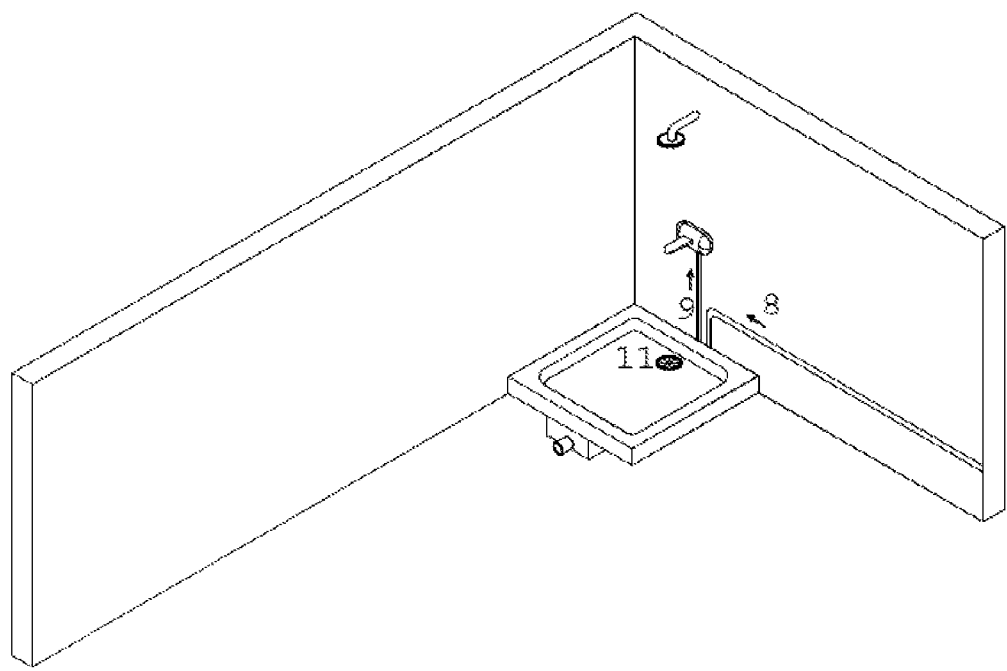
FIG. 5 represents an embodiment of a shower facility.
Figure 6:
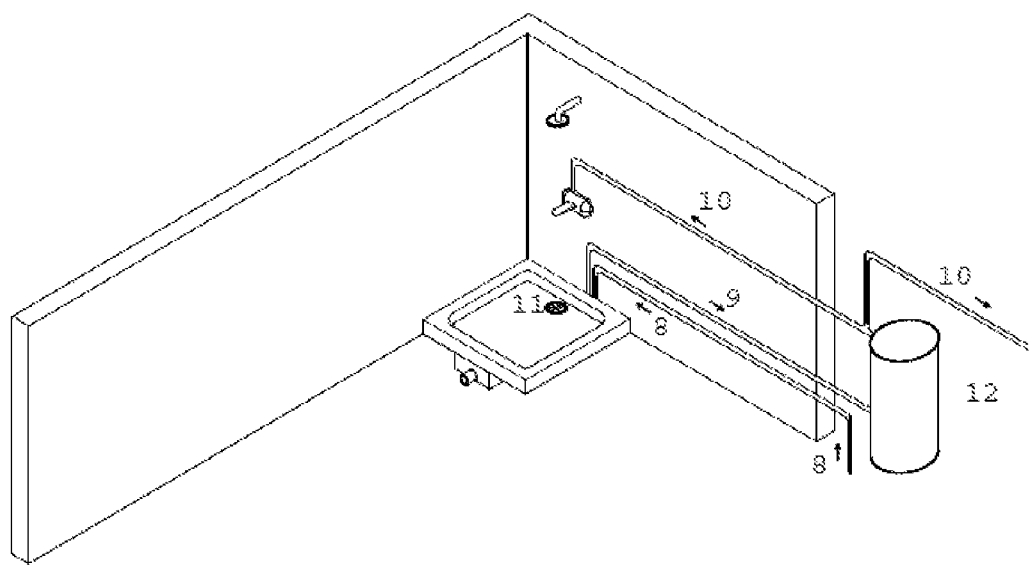
FIG. 6 represents an alternative embodiment of a shower facility with the use of a storage tank.
Figure 7:
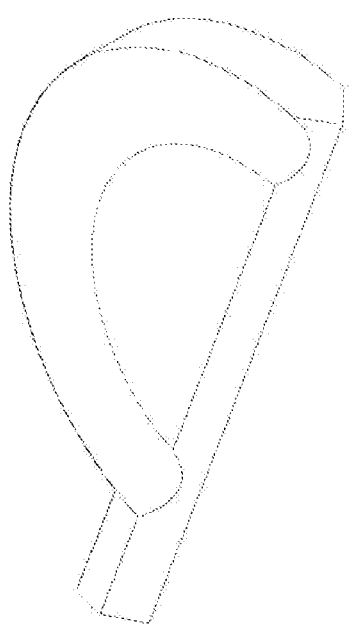
FIG. 7 represents a turbulence flap with a crescent shape and two half rods to fit in the turns of the coil.
Figure 8:
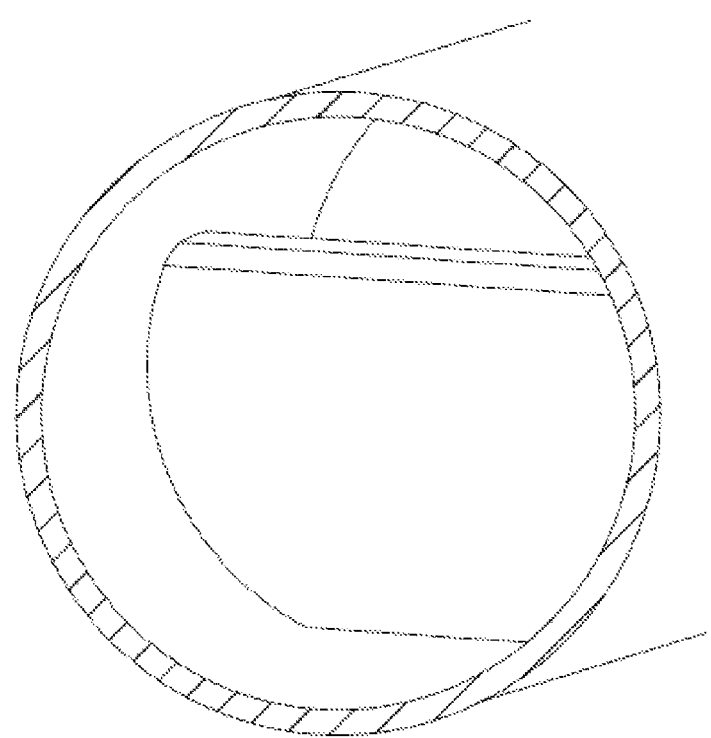
FIG. 8 represents the throttle plate.
Figure 9:
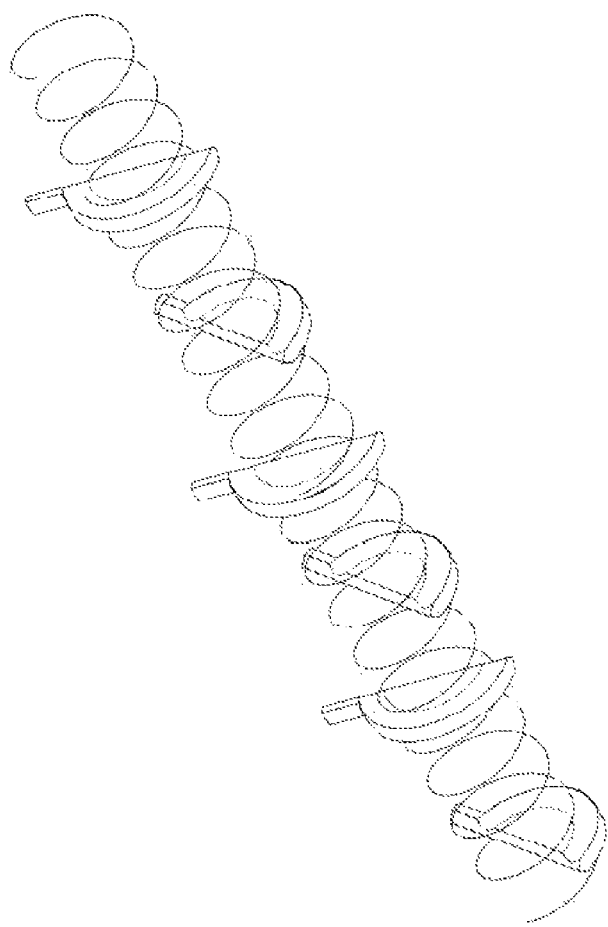
FIG. 9 represents the pressure mounting of the fins in the turns of the coil.

The energy recovery system is made, preferably, by a coil usually of copper inside a PVC pipe that has at one end a throttle plate also made of PVC, a filter protection system against impurities, turbulence fins and an outer housing. The energy recovery system presents a separation of the turns of ⅓ of the diameter of the tube coil.

It is also desirable the thermal insulation through the filling with insulating material, e.g. polyurethane, of the inside of the casing or through the use of a box produced in thermally insulating material, e.g. polystyrene. The outer casing should also be made of a material that provides mechanical strength to the assembly, e.g. a metal outer casing where the various parts are welded, bolted, riveted or glued, or simply engaged. The outer casing can also be made of rigid polystyrene that has a pressure fitting system or clamps and does not require the use of the previously mentioned external metal casing and insulation.

This box inside which there is the heat exchanger system is concealed under the floor, for example underneath a bathing facility.

The system can be equipped with a circular impurity retaining filter fitted at the inlet end of the PVC piping, fit into the socket of the valve, in order to avoid clogging problems in the pipeline in case the bucket, as a result of an oversight or for any other reason, is not present. This will make sure that the impurities (sand, hair, etc.) do not go into the piping. This retention filter has narrow passages in the form of slots that form one or more complementary sets.

The use of a throttle at the end of the system ensures that the tubing used is always in charge, i.e., with water inside when in use. This way ensures that the system retains water long enough to enable the heat transfer, and the system has time to boost the heat recovery of the same to the maximum. The existence of an opening at the bottom and at the top of the throttle plate will allow the passage of sand or other impurities that may have passed through the first filter and that might, otherwise, create problems or clogging of the drainage system.

Small fins are also used in the system interspersed in the turns of the coil to create a turbulent regime inside the PVC piping. The creation of this turbulent regime enhances the amount of heat recovered. The fins are shaped like half-moon and peripheral semi-rods that are interspersed alternately and placed under pressure between each pair of turns to facilitate the fitting of the same in the coil. The fins may also have a small ledge that will serve to maintain their position in the piping with a distance that is maintained constant and a lower foot to support the coil in the piping of waste water. The fins may also have a triangular shape and two half-rods in low relief.

The cold water piping from the supply network can be connected to the inlet collector of the coil and from the outlet collector a connection can be made to the mixer tap or can optionally be used a storage system through a water heater.

The heat recovery process with the system presented herein implies that the water that enters the collector exits the system at a temperature $t_2$ when compared to the environment temperature $t_1$ (heat exchanger), in which case the temperature $t_4$ of the outlet of waste water is lower than the inlet temperature $t_3$. The water supply must leave the outlet collector preheated and the pre-heating temperature can go up to 28° C. through the heat withdrawn from the waste water, considering 31° C. as the temperature at which the waste water enters the system.

The water that enters the collector (tap water) leaves the system at a temperature $t_2$ lower than the inlet temperature $t_1$ (water cooling system) in which case the temperature $t_4$ of the waste outlet is higher than the inlet temperature $t_3$.

The results indicate that the temperature gain when using this system is higher than the one of the system mentioned in the patent application PT104608 in about 30% for comparable sizes of pipings. It is still possible to get higher or lower temperature gains depending on the version of the system used, in particular as regards their piping length and/or use of the thermal insulation. This will result in considerable savings in terms of domestic energy consumption. On the other hand the fact that the block is integrated into the system facilitates the assembly of the heat recovery system on the basis of the shower or of the bath, since the correct positioning of the components to assemble is assured.

PREFERRED EMBODIMENTS

In a preferred embodiment, the system is applied at the base of a shower or at the bottom of the bath tub.

The bath water flows into the drain by the base valve of the shower base, with most of the impurities being trapped in the bucket or, in the absence thereof, becoming trapped in the filter placed in the inlet end. The waste water then passes into the piping, where the heat transfer to the coil (hot water from the bath) takes place. In this preferred embodiment a PVC pipe with O-rings and coil, 0.012 meters in diameter and 6 meters long is used. At the end of the piping, a throttle plate is mounted to allow the system to have water for long enough to promote the heat transfer. Then the waste water flows into the sewer.

The system has a coil connected to an inlet collector, through which will go the fluid that will make the heat recovery of the residual water of the piping. This coil is assembled in a helical shape inside the piping. Along the coil several fins are mounted interspersed between the turns, in order to create a turbulent regime in the piping in order to maximize the heat recovery. Subsequently the water inside the coil will pass through the outlet collector of the system to be used or to be stored in a water heater.

The invention claimed is:

1. A heat recovery system including a heat exchanger for heat recovery that comprises:
    an inlet collector for entering water originating from a water supply system for a plumbing fixture and entering the heat recovery system as residual water at a first temperature;
    one or more coils to exchange heat with the residual water, each of the one or more coils comprising one or more fins that are distributed between turns of each of the coils to create turbulence for enhancing heat recovery from the residual water; and
    an outlet for residual water leaving the heat recovery system as exiting water at a second temperature, the second temperature being of a lower value than the first temperature,
    wherein the fins have a crescent shape and is attached to a first rod which in turn is attached to a second rod that has twice a diameter of the first rod.

2. A heat recovery system according to claim 1, wherein a value of a separation of the turns of each coil is ⅓ of the diameter of a tube of the coil.

3. A heat recovery system according to claim 2, further comprising:
    a valve support to ensure watertight installation to the plumbing fixture; and
    a filtering system includes a circular plastic part (filter) that features narrow passages shaped as slots that form one or more complementary sets, and that fits in a plastic support of the valve support.

4. A heat recovery system according to claim 2, wherein the heat recovery system is covered by an outer casing that includes insulating material inside.

5. A heat recovery system according to claim 1, further comprising:
    a valve support to ensure watertight installation to the plumbing fixture; and
    a filtering system that is composed of a circular plastic part (filter) including narrow passages shaped as slots which form one or more complementary sets, and that fits in a plastic support of the valve support.

6. A heat recovery system according to claim 5, wherein the heat recovery system is covered by an outer casing that includes insulating material inside.

7. A heat recovery system according to claim 1, wherein the heat recovery system is covered by an outer casing that includes a filling with insulating material inside.

8. A heat recovery system according to claim 7, wherein the outer casing is comprised of plastic or a sheet of metal, and wherein parts of the outer casing are welded, bolted, riveted or glued, or engaged.

9. A heat recovery system according to claim 7, wherein the casing is made of rigid polystyrene.

10. A heat recovery system according to claim 7, further comprising:
    a valve support to ensure watertight installation to the plumbing fixture; and
    a filtering system includes a circular plastic part (filter) that features narrow passages shaped as slots that form one or more complementary sets, and that fits in a plastic support of the valve support.

11. A heat recovery system according to claim 1, further comprising a throttle plate placed at the end of the heat recovery system.

12. A heat recovery system according to claim 1, wherein the fins include a ledge.

13. A heat recovery system according to claim 1, further comprising a PVC pipe with O-rings, wherein the coil includes a diameter that is 0.012 meters and is 6 meters long.

14. A heat recovery system according to claim 1, further comprising a cold water piping for connecting the inlet collector and the outlet to a mixer tap.

15. A heat recovery system according to claim 1, further comprising an intermediate storage system that includes a storage tank.

16. A process for heat recovery employing the heat recovery system according to claim 1, wherein the residual water is at a third temperature and the exiting water is at a fourth temperature, the fourth temperature being a lower temperature than the third temperature.

17. A process for heat recovery according to claim 16, wherein the exiting water leaves the outlet collector at a temperature up to 28° C. when the entering water enters the heat recovery system at a temperature of 31° C.

18. A process for heat recovery according to claim 16, wherein the second temperature is higher than the first temperature.

* * * * *